F. A. PECK AND J. E. A. MOORE.
DRAWBAR.
APPLICATION FILED JUNE 24, 1920.

1,374,097.

Patented Apr. 5, 1921.

INVENTORS:
FRANK A. PECK
JAMES E. A. MOORE
BY
Freare, Merkel and Saywell
ATTORNEYS

UNITED STATES PATENT OFFICE.

FRANK A. PECK AND JAMES E. A. MOORE, OF CLEVELAND, OHIO.

DRAWBAR.

1,374,097.  Specification of Letters Patent.  Patented Apr. 5, 1921.

Original application filed November 25, 1918, Serial No. 264,048. Divided and this application filed June 24, 1920. Serial No. 391,457.

*To all whom it may concern:*

Be it known that we, FRANK A. PECK and JAMES E. A. MOORE, citizens of the United States, and residents of Cleveland, county of Cuyahoga and State of Ohio, have invented new and useful Improvements in Drawbars, of which the following is a specification, the principle of the invention being herein explained, and the best mode in which we have contemplated applying that principle, so as to distinguish it from other inventions.

The subject matter of this application has been divided out of our application for U. S. Letters Patent on draw-bars, Serial No. 264,048, filed November 25, 1918.

Our invention relates to draw-bars, and particularly to a device of this character adapted to secure an agricultural implement to a tractor. The object of the invention is to design an improved connection for this purpose, and which shall also function automatically to render the tractor non-effective, when an overload is imposed upon the implement, such as the encountering of an unusual obstruction in the path of the same.

The annexed drawing and the following description set forth in detail certain means embodying our invention, the disclosed means, however, constituting but one of the various mechanical forms in which the principle of the invention may be applied.

Figure 1:
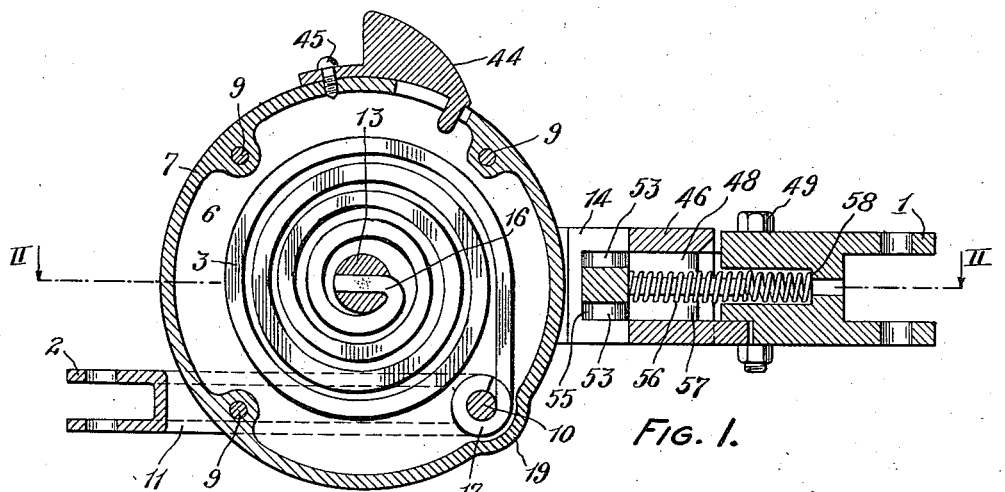
Figure 1 represents a central, vertical, longitudinal section of our improved draw-bar and automatic release, taken in the plane indicated by the line I—I, Fig. 2.
Figure 2:
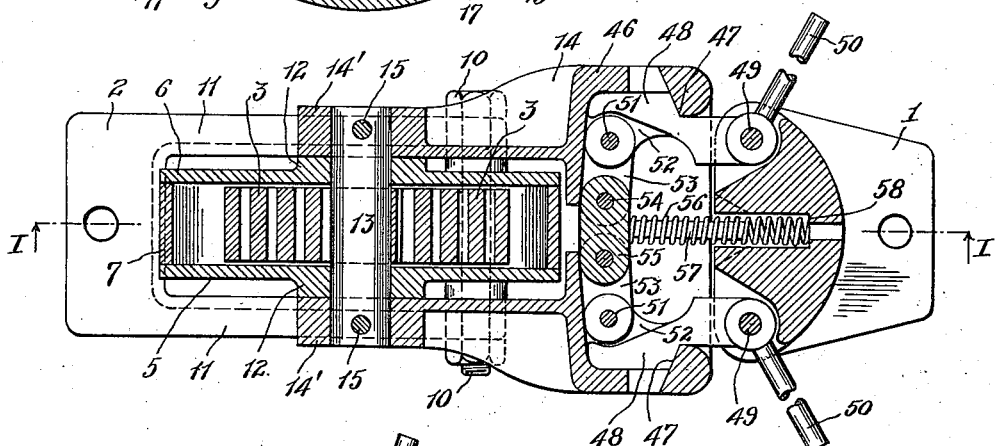
Fig. 2 represents a central, horizontal, longitudinal section thereof, taken in the plane indicated by the line II—II, Fig. 1.

Referring to the annexed drawing, tractor and implement connections are shown having the draw-heads 1 and 2, respectively. The design in effect flexibly joins together these two connections, the particular means therefor being a torsion spring 3 of the flat coil variety in the form of device illustrated. However, the use of other forms of torsion springs, such as the conical coil, the elongated coil, or other varieties, would come within the spirit of my invention. The spring 3, Figs. 1 and 2, is contained within a cylindrical casing comprising side plates 5 and 6 and a body plate or member 7. These plates 5, 6 and 7 are secured together by means of a plurality of machine screws 9 intersecting suitable bosses (not shown), formed upon the outer faces of the plates 5 and 6 and interior bosses formed upon the body member 7. An extended bolt 10 also intersects the side plates 5 and 6 and exteriorly of said plates is provided with journal portions for bearing members formed at the ends of two arms 11 comprising a yoke, into which the draw-bar end of the implement connection 2 is formed. The side plates 5 and 6 are also formed with enlarged centrally disposed bosses 12 forming bearings for an axle 13 extended outwardly somewhat at both ends from said bearings 12 and secured to end members 14', 14', formed in the two yoke arms 14 into which an auxiliary intermediate draw-bar member 46 is formed, Fig. 2. Said ends 14' are rigidly secured to the axle 13 by the machine bolts 15. The flat torsion spring 3 is secured at its inner end 16 to the axle 13 and at its outer end 17 to the bolt 10, enlarged bellied portions 19 of the members 5, 6 and 7 providing suitable accommodation for this purpose. It is evident that the afore-described design provides a flexible connection between the tractor and implement connections 1 and 2; that such flexibility will be exercised by the cylindrical casing rolling upon the axis of the bolt 10; and that said cylindrical casing will rotate an amount exactly proportioned to the flexibility of the spring utilized.

Now, it is designed to utilize this rotation of the cylindrical casing induced by the drag of the implement and opposed by the tension of the spring to cause a release mechanism automatically to function when said rotation reaches a predetermined amount.

Figure 3:
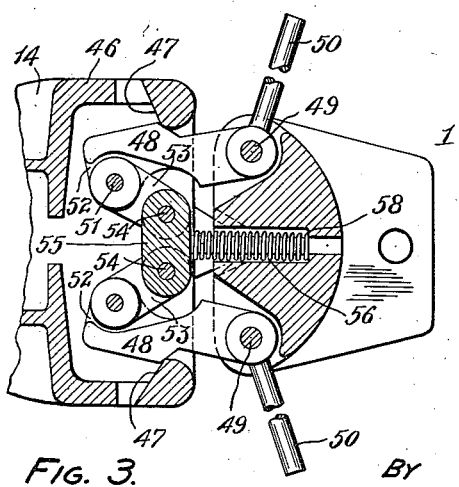
Fig. 3 represents a view of fragmentary parts shown in Fig. 2, when moved substantially to their releasing position.

Adjustably secured to the body member 7 of the cylindrical casing by a screw 45 and having an exterior cam surface, is a member 44. This surface is adapted to effect the release of certain jaws through the action of certain toggle links, hereinafter more fully described, when the cylindrical casing has rotated an amount determined upon as a maximum before the tractor should be rendered non-effective. The forward ends 46 of the arms 14 are formed with beveled jaw guides 47. A pair of jaws 48 are formed with surfaces adapted to coöperate with these guides 47 and are pivoted upon bolts 49 vertically extended through and upon both sides of the tractor connection 1. These bolts 49 may be actuated by steel rods 50 secured thereto. Two pairs of toggle links 53 are pivoted at their respective ends to the upper and lower portions of two pairs of bolts 51 and 54, the outer ends of the links being pivoted to the bolts 51 and the inner ends of the links being pivoted to the bolts 54, all as plainly shown in Figs. 2 and 3. Said bolts 51 are secured within inwardly projecting portions 52 of the jaws 48. Bolts 54 intersect a centrally disposed toggle guide 55. Said toggle guide 55 and the tractor connection 1 are normally spaced a maximum distance apart through the tension of a coil spring 56 surrounding a pin 57 forwardly extended from said guide 55 and abutting against a shoulder 58 formed in the draw-head 1. It is evident from the aforegoing description that a sufficient rotation of the cylindrical casing will cause the cam surface 44 to bear upon the toggle guide 55, gradually forcing said guide forwardly and ultimately resulting in the pulling together of the jaws 48 and the freeing of the same from the beveled surfaces 47. Then the pull of the tractor will result in the freeing of the draw-head 1 and the associated parts, plainly shown in Fig. 3, from the members 46. When it is desired to reconnect the parts, the jaws 48 and associated mechanisms are sufficiently manually actuated through the medium of the steel rods 50 to allow of the entrance of the jaws 48 within the space defined by the inner edges of the beveled guides 47 and the rods 50 then released.

What we claim is:—

1. A draw-bar comprising a pair of coupling heads; a torsion-spring whose ends are respectively secured relatively to said heads; a movable member intermediate said heads and adapted to be moved amounts proportioned to the stress to which said spring is subjected; movable jaws secured relatively to one of said heads; jaw guides, said jaws and guides interlocking said movable member and said last-mentioned head; means for maintaining said jaws normally effective; and means supported upon said movable member and adapted, upon a predetermined movement of the same, to move said jaws to release the same from the guides.

2. A draw-bar comprising, a pair of coupling heads; a torsion spring whose ends are respectively secured relatively to said heads; a pivotally mounted member whose movements are proportioned to the stress to which said spring is subjected; means supported by said spring for supporting said member, the latter being provided with a cam surface, one of the coupling heads comprising a two-part member having coöperating movable jaws and jaw guides; toggle links secured to said jaws; and means acting upon said links for maintaining said jaws normally effective, said cam surface, upon a predetermined amount of movement of such pivoted member, being adapted to render such last-mentioned means non-effective and to move said links positively to release said jaws.

3. A draw-bar comprising, a pair of coupling heads; an axle; a member rotatably mounted upon said axle, one of said coupling heads being pivotally secured to said member; a torsion spring whose ends are respectively secured to said axle and said member; a trip adjustably secured to said member; a member secured at one end to said axle and formed at the other end with jaw guides; a pair of jaws pivotally secured to the other coupling head and adapted to coöperate with said guides to interlock said last-mentioned member and said last-mentioned coupling head; means for maintaining said jaws normally effective; and movable suitably supported means disposed in the path of movement of said trip for releasing said jaws.

4. a draw-bar comprising, a pair of coupling heads; an axle; a member rotatably mounted upon said axle, one of said coupling heads being pivotally secured to said member; a torsion spring whose ends are respectively secured to said axle and said member; a lug formed with a cam surface and adjustably secured to said member; a member secured at one end to said axle and formed at the other with jaw guides; a pair of jaws pivotally secured to the other coupling head and adapted to coöperate with said guides to interlock said last-mentioned member and said last-mentioned coupling head; a movable toggle guide disposed intermediate said jaws; two pairs of toggle links secured, respectively, to the free ends of said jaws and said guide; and a spring abutting said toggle guide and said last-mentioned coupling head and normally holding the same a maximum distance apart, said toggle guide being disposed in the path of movement of the cam surface of said lug.

Signed by us, this 23" day of June, 1920.

FRANK A. PECK.
JAMES E. A. MOORE.